United States Patent
Sharp et al.

(10) Patent No.: US 10,060,681 B2
(45) Date of Patent: Aug. 28, 2018

(54) HEAT PIPE AUGMENTED PASSIVE SOLAR HEATING SYSTEM

(71) Applicant: University of Louisville Research Foundation, Inc., Louisville, KY (US)

(72) Inventors: M. Keith Sharp, Louisville, KY (US); Brian S. Robinson, Lanesville, IN (US)

(73) Assignee: UNIVERSITY OF LOUISVILLE RESEARCH FOUNDATION, INC., Louisville, KY (US)

( * ) Notice: Subject to any disclaimer, the term of this patent is extended or adjusted under 35 U.S.C. 154(b) by 34 days.

(21) Appl. No.: 15/271,777

(22) Filed: Sep. 21, 2016

(65) Prior Publication Data
US 2017/0089645 A1    Mar. 30, 2017

Related U.S. Application Data

(60) Provisional application No. 62/232,676, filed on Sep. 25, 2015.

(51) Int. Cl.
*F28D 15/02* (2006.01)
*F28D 15/06* (2006.01)
(Continued)

(52) U.S. Cl.
CPC .............. *F28D 15/02* (2013.01); *F24S 20/66* (2018.05); *F24S 60/30* (2018.05); *F28D 15/06* (2013.01); *Y02B 10/20* (2013.01); *Y02E 10/44* (2013.01)

(58) Field of Classification Search
CPC ...... F28D 15/02; F28D 15/06; F28D 15/0266; F24J 2/0444; F24J 2/32; F24J 2/345;
(Continued)

(56) References Cited

U.S. PATENT DOCUMENTS 4,182,406 A * 1/1980 Holbrook ............ F24D 11/0221
165/48.2
4,280,333 A * 7/1981 Corliss .................. F24D 11/003
126/572
(Continued)

OTHER PUBLICATIONS

Robinson, et al.; Heating season performance of a full-scale heat pipe assisted solar wall; Article; Solar Energy; 2013; pp. 76-83; 87; available online at www.sciencedirect.com; www.elsevier.com/locate/solener; (c) 2012 Elsevier Ltd.*
(Continued)

*Primary Examiner* — Justin Jonaitis
(74) *Attorney, Agent, or Firm* — Wyatt, Tarrant & Combs, LLP; Stephen C. Hall (57) ABSTRACT

A heat pipe augmented passive solar space heating system modulates the temperature inside a building structure, particular during heating seasons when the ambient temperature is below levels customarily associated with adequate room comfort, and in some embodiments comprises a solar absorber, a heat pipe surrounding wholly or partially by insulation, the heat pipe having three main sections which are an evaporator at one end proximal to the solar absorber, a condenser at the other end proximal to an interior room being heated, and a rubber adiabatic section between those. Additional aspects such as a mechanical valve in the adiabatic section are disclosed to limit unwanted thermal gains when cooling is needed because the ambient temperatures already exceed room comfort.

22 Claims, 5 Drawing Sheets

(51) Int. Cl.
*F24S 60/30* (2018.01)
*F24S 20/66* (2018.01)

(58) Field of Classification Search
CPC .. F24D 11/003; F24D 11/007; F24D 11/0221; Y02B 10/20; Y02E 10/40
USPC .......... 165/48.2, 104.21, 104.19, 104.26, 96, 165/104.11, 48.1
See application file for complete search history.

(56) References Cited

U.S. PATENT DOCUMENTS

| | | | |
|---|---|---|---|
| 4,444,249 A | | 4/1984 | Cady |
| 4,686,961 A | | 8/1987 | Garrison |
| 5,950,710 A | | 9/1999 | Liu |
| 2008/0236807 A1 | * | 10/2008 | Kim ................ F28D 15/0266 165/274 |
| 2010/0287929 A1 | * | 11/2010 | Loidl ..................... F01K 25/02 60/524 |

OTHER PUBLICATIONS

Robinson, et al.; Heating season performance improvements for a solar heat pipe system; Article; Solar Energy; 2014; pp. 39-49; 110; available online at www.sciencedirect.com; www.elsevier.com/locate/solener; (c) 2014 Elsevier Ltd.

Robinson, et al.; Reducing unwanted thermal gains during the cooling season for a solar heat pipe system; Article; Solar Energy; 2015; pp. 16-32; 115; available online at www.sciencedirect.com; www.elsevier.com/locate/solener; (c) 2015 Elsevier Ltd.

Nkwetta DN, et al.; Experimental Performance Evaluation and Comparative Analyses of Heat Pipe and Direct Flow Augmented Solar Collectors; Article; Applied Thermal Engineering; 2013; pp. 225-233; 60; www.elsevier.com/locate/solener; (c) 2013 Elsevier Ltd.

Susheela N & Sharp MK; A Heat Pipe Augmented Passive Solar System for Heating of Buildings; Article; Journal of Energy Engineering; Apr. 2001; pp. 18-36; 127(1).

* cited by examiner

HEAT PIPE AUGMENTED PASSIVE SOLAR HEATING SYSTEM

CROSS REFERENCE TO RELATED U.S. APPLICATION

This application claims the benefit of priority to U.S. Provisional Application No. 62/232,676, which was filed on Sep. 25, 2015, the contents of which are incorporated herein by reference.

GOVERNMENT RIGHTS

This invention was made with government support under DE-FC36-05GO85034, awarded by the United States Department of Energy. The government has certain rights in the invention.

FIELD OF INVENTION

Embodiments described herein relate to passive space heating systems for use during a heating season that utilize solar energy, resulting in a two-phase heat transfer within a heat pipe, as well as features to prevent unwanted heat gains during a cooling season.

BACKGROUND

Virtually all buildings across the United States require space heating at some point during the year. Studies have suggested that 43% of all US energy is consumed in relation to buildings, including 72% of electricity and 55% of natural gas. It follows, then, that addressing building energy use is an important consideration to addressing energy issues in this and other countries, because buildings have great potential to see dramatic reductions in energy use and carbon emissions through effective temperature management. Particularly, the cooling of buildings is of great importance in today's society. Even so, as energy costs increase and the need for alternative heating systems becomes more pronounced, there might not be a single solution or best practice for addressing the challenge. Consider that conventional auxiliary heating and venting has long been used and continues to be used in order to keep the insides of buildings in a general comfort range, such as about 65-75° F. These auxiliary heating and venting systems are probably not going to go away any time soon, and the current efforts to reduce energy costs are not necessarily aimed at supplanting the auxiliary heating and venting systems. Rather, viable solutions, including those described herein, might have the effect, at least initially, of reducing the overall load placed on auxiliary heating and venting, thus reducing energy costs while keeping rooms of buildings at an acceptable comfort range. If the overall result is to save on a percentage of the annual heating load served by the auxiliary heating and venting, the heat pipe system will be providing a net gain.

Moreover, active heating systems which are known in the art typically require fans, impellers, motors, and other equipment with moving parts that wear out. These approaches, representing the primary difference between active and passive heat transfer systems, have been hampered by a number of factors. Mainly, these factors involve the equipment required for transferring a material from a first location, proximal to the heat source (e.g., solar), to a second location distal to the heat source. At the second location, the transferred energy is dissipated or otherwise distributed. Because the equipment that is used for actively transferring this material is prone to wear out and need replacing, the active systems lack overall efficiency. An improved system for heat transfer is needed.

SUMMARY OF EMBODIMENTS

The present embodiments described herein provide an improved passive heat transfer system, which can be comprised of a single heat pipe or multiple heat pipes. In some embodiments, the heat transfer system comprises a solar absorber that receives solar energy, which in the preferred form is positioned outside of a subject building to be heated, as well as a thermal storage tank which in the preferred form is positioned inside the subject building. In some embodiments, each heat pipe comprises a conduit for holding a working fluid, and the conduit has a first end comprising an evaporator that is proximal to the solar absorber where solar energy from the solar absorber is transferred. In some embodiments, the solar absorber is made from a metal or a metal allow, i.e., materials with adequate thermal conductivity and which are able to withstand high temperatures from natural sunlight at the absorber.

The conduit also has a second end comprising a condenser that receives the working fluid from the evaporator while the working fluid is in a gas state. Thus, when the working fluid is present in the first end, the solar energy received from the solar absorber is transferred to the working fluid while the working fluid is in a liquid state. As the working fluid heats beyond its boiling point, the gas from evaporation travels in the direction from the evaporator to the condenser as a gas, transferring energy from the first end of the conduit to the second end of the conduit. When the gas reaches the condenser, it is converted back to liquid and the energy associated with the cooling is stored in the storage tank. Because of the effectiveness of heat transfer through evaporating and condensing the working fluid, the current system operates with a relatively small temperature gradient throughout, providing very efficient thermal conductance properties.

In some embodiments, an adiabatic section is positioned between the first end and the second end to limit thermal bridging, i.e., the return of energy in the direction moving from the condenser to the evaporator. This is undesirable because the more energy moving retrograde in this fashion, the less will be stored in the storage tank for use in providing heating to the subject building. Generally, the adiabatic section comprises a region of conduit formed from a thermal insulating material. In some embodiments, the material for the adiabatic section is different from the material forming at least one of the conduit ends. A suitable material for the adiabatic section is a durable rubber as known in the art including a damp proof membrane (DPM) of high density polyethylene. Suitable materials for the evaporator and condenser ends, respectively, include copper and aluminum.

The heat pipes and related systems according to multiple embodiments and alternatives are intended to work such that the movement of the working fluid as it alternates between phases (i.e., states) produces a temperature gradient between the first and second ends of the conduit, such that the second end of the conduit (i.e., condenser end) thermally communicates with the thermal storage tank to allow the thermal storage tank to receive and store energy from the condenser. As further discussed below, additional structures and features are provided herein to be used as desired. For example, while the heat transfer system and methods described herein are desirable for heating season, they might produce unwanted gains during cooling season. Therefore, a number of features described herein are for reducing or eliminating the effects of the system during warmer seasons, when cooling is more desirable than heating.

Accordingly, present embodiments provide a system for passively heating a building, or passively cooling a building, which requires minimal maintenance and produces high levels of heat transfer into the building space. Given that no mechanical pumping force is employed to transport the working fluid as it moves within the heat pipe, such a system has no moving parts to replace. Moreover, the embodiments take advantage of the thermal diode effect of heat transfer occurring by the activity of a working fluid moving between the two ends of the conduit. During passive heating, the system limits heat losses from the space back out to the cold ambient environment. Additionally, two-phase heat transfer allows the heat pipe to operate with relatively small temperature gradients throughout, and enables the passive heating system to operate with small elevation differences, with one end being inclined relative to the other. This allows the system to be installed efficiently in the wall of a subject building, for example in a south-facing wall. In this way, the passive heating system according to present embodiments can be employed in both new buildings and in existing buildings as retrofits, and the passive heating system can be beneficially utilized in a wide variety of climates.

Based on the two-phase heat transfer approach employed herein, when the working fluid is in liquid form, it has the potential to be heated by the energy at the absorber. Upon sufficient heating, the working fluid is converted to vapor, which passes through the heat pipe to the condenser end where the energy is transferred to the liquid in the storage tank. As further explained herein, present embodiments offer improvements to such systems that have been known and used in the past.

In some embodiments, the absorber is enclosed with a transparent cover formed from glass or similar materials that allow radiation to pass. Optionally, an opaque cover is added to exclude solar radiation when heat gains are unwanted. In some embodiments, a valve is installed between the condenser end of the heat pipe and the adiabatic section, whereby closing the valve isolates the adiabatic section from the condenser end and prevents fluid communication with the evaporator end. Accordingly, a valve such as this "turns off" the phase change heat transfer mechanism and prevents thermal energy from passing to the condenser end, for example during the summer when the thermal gains are unwanted.

Further, the present embodiments can be practiced as a method of providing passive heating to a building. In one aspect, such a method comprises positioning at least one heat pipe proximal to a solar absorber at a first end of the heat pipe, and proximal to a storage tank at a second end; configuring the heat pipe with an evaporator at the first end that receives solar energy from the solar absorber and transfers the solar energy to a working fluid in a liquid state, such that as the liquid heats it evaporates, and configuring the heat pipe with a condenser at the second end that transfers the energy produced as the gas produced at the evaporator contacts the condenser, cools, and turns to liquid. Further, such a method includes configuring the heat pipe with an adiabatic section to limit retrograde transfer of energy along the conduit in the direction from the condenser to the evaporator. As desired, the method includes placing the second end with condenser proximal to a storage tank that receives and stores the energy produced as the gas cools back to liquid. Alternatively, the method employs at least one heat pipe that is not in thermal communication with a storage tank, but rather is open to the environment such that the energy from the phase conversion as the gas cools is transferred more directly to the room of the building through an opening found in the second end of the heat pipe, such as a bore that is machined into the end of the pipe, which is exposed to the room.

Generally, a passive heating system according to present embodiments meets the objectives of an increased rate of useful thermal gains to thermal storage and to one or more interior rooms, while exhibiting a decreased rate of thermal losses to the ambient environment. Improved heat delivery to the interior and reduced losses to ambient facilitate the efficient operation of the system and save money on power consumption.

While some systems that were previously known have sought to transfer heat between a solar absorber and a storage tank, many are active systems that use pumps and similar equipment located along the conduit to transfer the heat, thus increasing cost and maintenance. In contrast, the embodiments of a heat pipe augmented heating system described herein are passive in their operation.

As desired, when practicing these embodiments a plurality of heat pipes are positioned between the absorber and the storage tank to allow phase change heat transfer through multiple conduits. In some embodiments, at least one extra heat pipe is configured with the evaporator end at the absorber, and its condenser end exposed directly to room air, resulting in faster heating at times of the day when that is advantageous, such as early morning after the sun first rises.

Additional features are also disclosed, to make the operation of the current system and method of heat pipe energy transfer more effective and efficient. In some embodiments, the second end of the conduit is at an incline relative to the first end, wherein the incline is adjustable. To facilitate energy transfer at the solar absorber, in some embodiments a fin is joined to the evaporator at the first end proximal to the solar absorber, such that this portion of the evaporator is directly exposed to solar energy received from the solar absorber. On the other hand, to mitigate against unwanted thermal gains, in some embodiments a valve is positioned in the adiabatic section to limit heat transfer moving in the direction from the condenser to the evaporator when the valve is closed or partially closed compared to when the valve is opened.

Present embodiments provide an improved heat transfer system over prior ones. A number of further advantages associated with the present embodiments will be easily observable from the further discussion of multiple embodiments and alternatives herein.

FIGURES

The drawings, schematics, figures, and descriptions contained herein are to be understood as illustrative of steps, structures, features and aspects of the present embodiments and do not limit the scope of the embodiments. The scope of the application is not limited to the precise arrangements or scales as shown in the figures.

MULTIPLE EMBODIMENTS AND ALTERNATIVES

Figure 1:
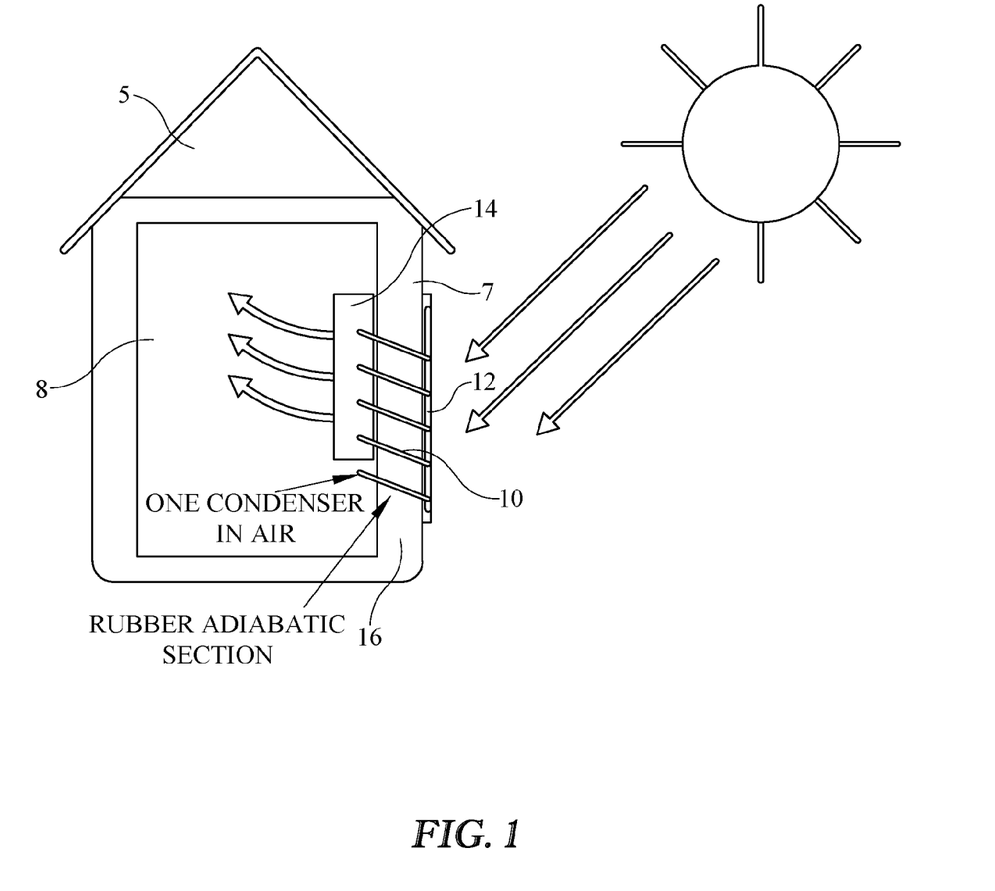
FIG. 1 is a schematic of a heat transfer system, according to multiple embodiments and alternatives.

FIG. 1 is a schematic diagram of a heat transfer system in use, according to multiple embodiments and alternatives. The heat transfer system is shown having been installed on a building structure 5, which has an interior 8, and the system is installed on a wall 7 which is an exterior wall. It has been found that advantages are gained in some locales to have the system installed on a south wall of structure 5. FIG. 1 further shows several heat pipes, in this case labeled as 10a, 10b, 10c, 10d, and 10e. However, the quantity and positioning of heat pipes 10 will vary based upon the needs and desires of a user. Each heat pipe serves as a conduit and has a first end in proximity to or in contact with a solar absorber 12, and a second end position within, as shown here, or in thermal communication with a storage tank 14. Desirably, a high-temperature insulation is added to surround the heat pipes 10 including near the absorber in order to limit thermal losses as the working fluid moves physically within the heat pipes, as the working fluid cycles through evaporation and condensation. The scope of embodiments is not limited by choice of working fluid. Rather, many options are available, including refrigerants meeting ASHRAE refrigeration-related standards and guidelines, as well as other phase change materials that absorb and store, and release, thermal energy during the process of evaporation and condensing.

In some instances, holes can be drilled in an existing structure to accommodate the heat pipes, having their first end exterior of the structure and their second end on the interior. Typically, there is insulation 16 in the wall which can be any conventional insulation suitable for building materials. In some instances, the natural insulation existing in wall 7 will serve as insulation 16, however as desired additional insulation is provided in the wall or surrounding and contacting heat pipe(s) 10. In addition to installing them on existing structures, it is anticipated that the systems according to these embodiments, and the methods of use disclosed herein, should be practiced on new constructions.

By evaporating the working fluid in the evaporator, which is connected to the solar absorber, then condensing the gas vapor at the condenser, leading to the storage tank if desired, solar energy is captured, transferred, converted, and stored for use inside of a subject building. Accordingly, present embodiments achieve improved performance, marked by greater evaporator temperatures and cooling of the solar absorber to lower temperatures during the night, in part due to improvements in the heat pipe such as the adiabatic section discussed in further detail below. Accordingly, when delivering energy to space 8 within structure 5 is the main objective, some relevant considerations of the system include limiting the thermal resistance of the solar absorber between the absorber and evaporator (in this regard, copper conduit soldered to the solar absorber is preferred over aluminum that is epoxy-bonded to the evaporator); the thickness of the insulation surrounding the heat pipe, and particularly the adiabatic section discussed herein; choice of material for the adiabatic section, e.g., rubber, for reducing thermal losses; storage means; and whether to expose the condenser of one or more heat pipes directly to the room as opposed to storing the energy produced during condensation. These are among the factors for increasing the rate of useful gains and decreasing thermal losses, leading to greater system efficiency, and higher room temperature for less cost.

Thermal efficiency of the system can be calculated as the ratio of power delivered by the heat pipes over power received from the sun, according to the following equation:

$$\eta = Q_u/SA_c \quad (1)$$

where S is the solar power received by the collector per unit of area, and Qu is the useful power delivered by the heat pipes to storage and to the room. In some embodiments, the power delivered reflects that all of the one or more heat pipes is in thermal communication with the storage tank, but alternatively one or more of the heat pipes comprises a single condenser at its second end which is exposed directly to the interior 8 of the structure.

In keeping with the above, the total useful power for a particular system can be calculated as:

$$Q_u = M_{cp}\Delta T_s/\Delta t + (T_s - T_r)/R_{sr} \quad (2)$$

where M is the mass of the water in the storage tank, cp is the specific heat of the water, $\Delta T_s$ is the water temperature change during a time interval $\Delta t$ (e.g., per hour), $T_s$ and $T_r$ are the temperatures for the water and room, respectively, and Rsr is the total thermal resistance from the thermal mass to the room air. Accordingly, on the right-hand side of equation (2), the first term represents the net power to the storage tank, $Q_s$, and the second term represents the power transfer from the storage tank 14 to the room, denoted by $Q_{out}$. Using these calculations, efficiencies well above 90% are expected through the use of the present embodiments. The potential exists for very high solar fractions in well-insulated buildings, leading to greater output and a favorable load to collector ratio, which also reflects the amount of power received compared to the power delivered by the system.

Figure 2:
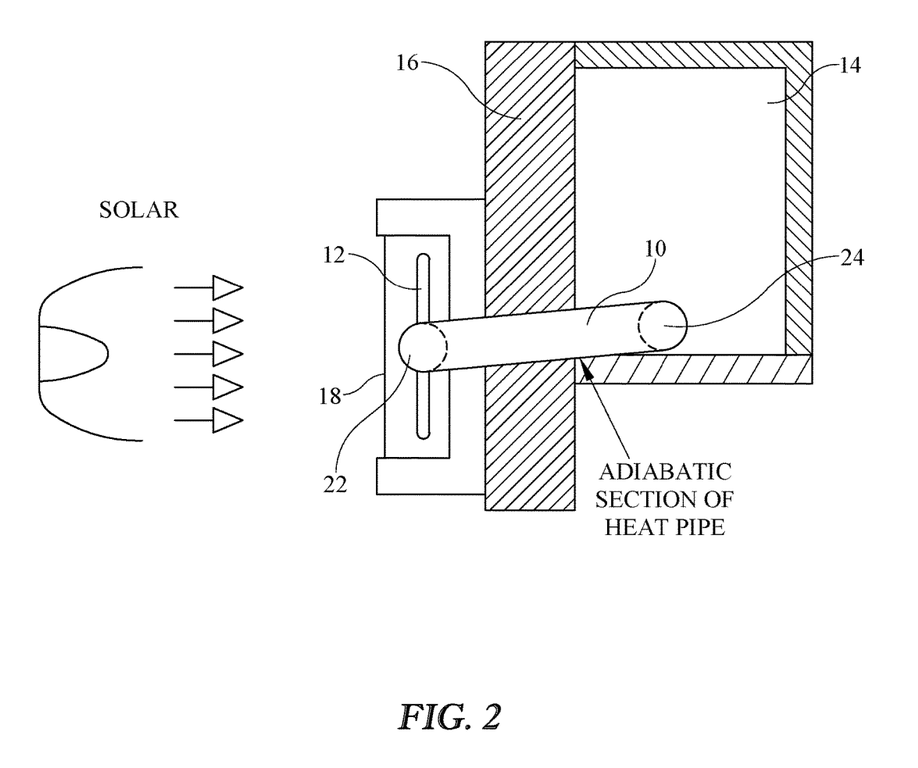
FIG. 2 is another schematic of a heat transfer system, showing a building with rooms and an exterior wall in cross section, according to multiple embodiments and alternatives.

FIG. 2 provides another schematic of a heat transfer system according to multiple embodiments and alternatives. As shown, insulation 16 surrounds the heat pipe 10. A first end 22 of the heat pipe (which would be positioned proximally to solar absorber 12) is shown, while a second end 24 is contained within storage tank 14. The solar absorber 12 can be a plate formed from materials that provide suitable performance to absorb solar energy from the sun's rays with limited reflectivity, as known in the art. Examples of such material include copper, aluminum, and steel, as well as other metals or metal alloys that absorb solar energy. Skilled artisans will appreciate that aluminum is cheaper than copper. Thus, although not meant as limiting, in some embodiments, a heat pipe 10 has an evaporator 23 formed from aluminum and connected to a copper absorber 18, which can be in the form of a plate(s) and using grooved channels (not shown) in the absorber plates to mate with the evaporator, or with fins (not shown) which are soldered onto the evaporator, optionally at the center line. Alternatively, evaporator 23 is connected to the absorber via highly thermally conductive epoxy. Often, it will be desirable for the solar absorber to have a cover 18. In some embodiments, cover 18 is made of glass, and has a solar transmittance sufficient to allow absorption of solar energy during insolation at an acceptable level. Preferably, the level of transmittance is above 90%. In some embodiments, the cover serves to help direct the sun's rays to the solar absorber for greater efficiency and system performance.

Figure 3:
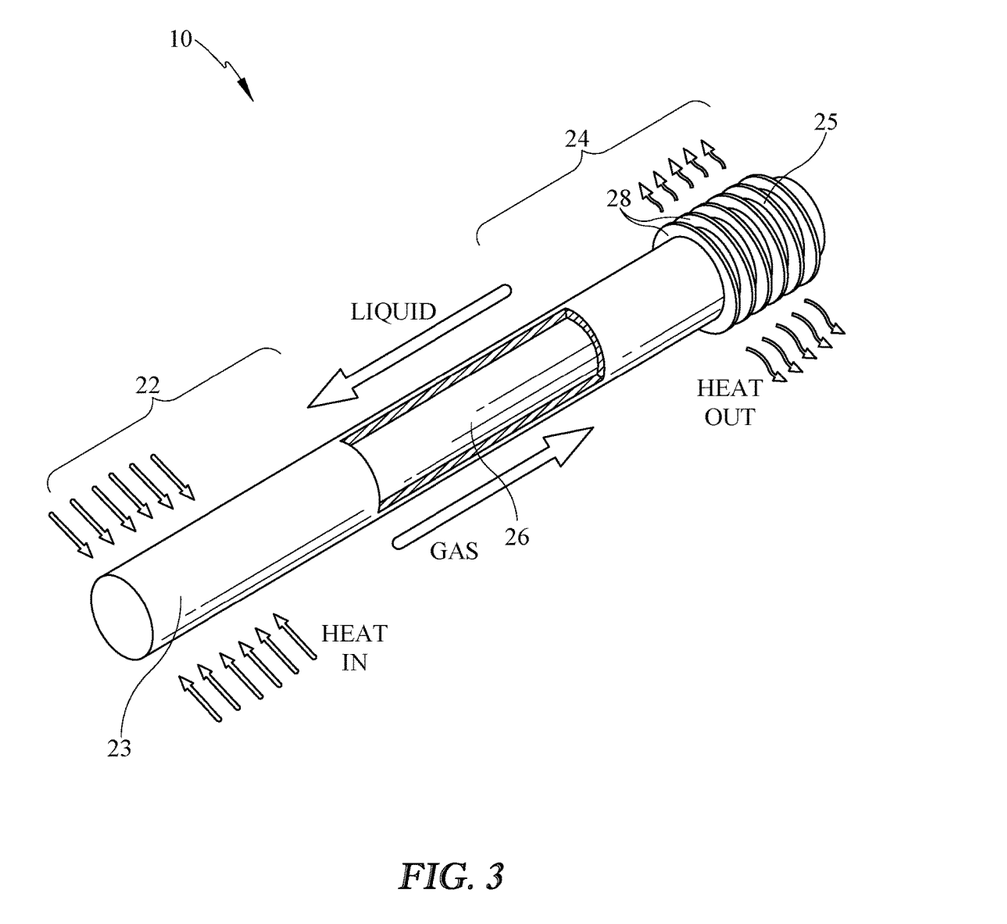
FIG. 3 is a perspective view that contains a partial cutaway to show portions of the interior of a heat pipe, according to multiple embodiments and alternatives.

FIG. 3 is a perspective view that includes a partial cutaway of a portion of the body of a heat pipe 10 in relation to adiabatic section 26. In some embodiments, this section is formed from rubber such as but not limited to high density polyethylene. First end 22 is shown and includes evaporator 23 where energy from the solar absorber comes into the pipe as heat. Second end 24 includes the condenser 25 where heat is exchanged with an interior space of a building, either directly or via a storage tank. As previously mentioned, first end 22 is joined to solar absorber 12. A suitable material for the ends of the pipe is copper, although many alternatives such as aluminum exist. Preferably, the ends of the conduit on either side of the adiabatic section are formed from materials having better thermal conductivity than the materials used in forming the adiabatic section of the heat pipe. Copper has higher conductivity than aluminum, although aluminum is obviously less expensive. In some embodiments, this copper end of the heat pipe 10 including evaporator 23 is soldered to the solar absorber 12. Alternatively, these are joined through other means known in the art, including an aluminum pipe joined to the solar absorber with epoxy glue. Additionally, FIG. 3 shows optional condenser fins 28, which may provide further gains based on an increase in the heat transfer area. With reference to FIG. 2, in some embodiments the length of adiabatic section 26 is greater than the thickness of an exterior wall of a building where the heat pipe(s) is going to be used, either as a retrofit on existing construction or as a new construction. By way of non-limiting example, a heat pipe 10 arranged for an exterior wall 7 that is twelve inches thick may have an adiabatic section that is greater than 12 inches in length. Notwithstanding this illustration, the scope of embodiments herein is not limited in terms of the length and dimension of the adiabatic section in relation to the pipe as a whole, as well as the length and dimension of the pipe itself.

In some embodiments, heat pipe 10 is substantially linear as illustrated in FIG. 3. Alternatively, heat pipe 10 is configured with several components positioned at angles (not shown). For example, optionally the evaporator located at first end 22 of the heat pipe, generally exterior to the building wall or proximal to the exterior, is bent at about 90° to the body of heat pipe 10 including its adiabatic section. Likewise, the condenser located at the second end 24 of the heat pipe optionally is bent at about 90° to the body as it runs into the storage tank or is directly exposed to the room in the building interior. In some configurations, the angle is different than 90°, or adjustable as determined by a user. As desired, one or more brackets are employed to reinforce angled sections. Likewise, in addition to slope of the incline as discussed herein as a factor to control movement of the working fluid, the angle of the evaporator to the main body may be arranged so that working fluid in the form of vapor rises going from evaporator 23 to the main body of heat pipe 10, while liquid at the condenser is aided by gravity as it moves from condenser 25 into the main body. Also, the angulation can be adjusted, for example during the cooling season, so working fluid in liquid form must work against gravity in order to progress from the condenser into the main body and back the evaporator.

In use, the solar absorber will exhibit a temperature increase at the onset of insolation (exposure to the sun's rays). At night, or otherwise upon blockage of insolation, the evaporator 23 and solar absorber 12 will see their temperatures decrease. During heating season, it is desirable for the energy stored at the second end to remain at that end, without diminishing the energy stored in the storage tank. The adiabatic section helps in this by reducing or eliminating thermal bridging from the condenser in the direction of the evaporator.

Additional features which produce a higher rate of increase in temperature include increasing the number of heat pipes, increasing the size of the storage tank, and increasing the convective surface area between the surface area of the storage tanks and a room. It has been found that directly exposing the condenser in one of the heat pipes to the space 8 within a room of a building structure produces a more immediate rate of increase in room temperature. Another option to facilitate performance is the addition of fins soldered onto each evaporator, for example at the centerline, protruding away from the evaporator and leaving a portion of the evaporator directly exposed to insolation for improved heat transfer from the solar absorber.

It will be appreciated by skilled artisans that vapor rises, so providing the first end 22 (corresponding with evaporator 23 as shown in FIG. 3) of the heat pipe 10 at a lower point than the second end 24 is a design option. In some embodiments, the incline going from first end 22 to second end 24 is about 2-10 degrees, preferably about 5 degrees. This aids in allowing the working fluid when in a liquid state to passively travel from the condenser to the evaporator under gravity. In some embodiments, the level of incline is adjustable to meet system demands. Adjustment of the incline of the heat pipes can be accomplished through, by way of example, levers, gears, or other similar apparatus and techniques (not shown) as known to conventional practitioners. Further, the direction of incline can be reversed to slow down the cycle and reduce heating, thereby taking advantage of the fact that a working fluid in a liquid state will not travel against gravity from the lower condenser end to a raised evaporator end.

When the present embodiments are practiced, it will be understood that one season in any given locale will require heating (e.g., the months of December-March), while another season occupying different months in the same locale will require cooling (e.g., May-September). During the cooling months, therefore, it might be desirable to reduce unwanted thermal gains when ambient temperature exceeds the upper comfort limit. However, the heat transfer system will cause the temperature inside the building to increase during the cooling seasons as well, unless the system is controlled. Again, if the objective is to save on a percentage of the annual heating load of the building structure, it is possible for any net gains during the heating season to be wiped out by excessive cooling costs at a different time in the year. Fortunately, a number of controls are possible to implement without compromising the passive nature of the system. In some embodiments, the direction of heat transfer in the heat pipe is reversed, which effectively switches the elevations of the evaporator and condenser ends due to changes in incline relative to those two ends. (FIG. 4D.) Heat is thus transferred out of thermal storage and from the building interior to the exterior when the absorber located exterior of the building is cooler than storage, which generally will tend to occur at night and on cloudy days.

Figure 4A:
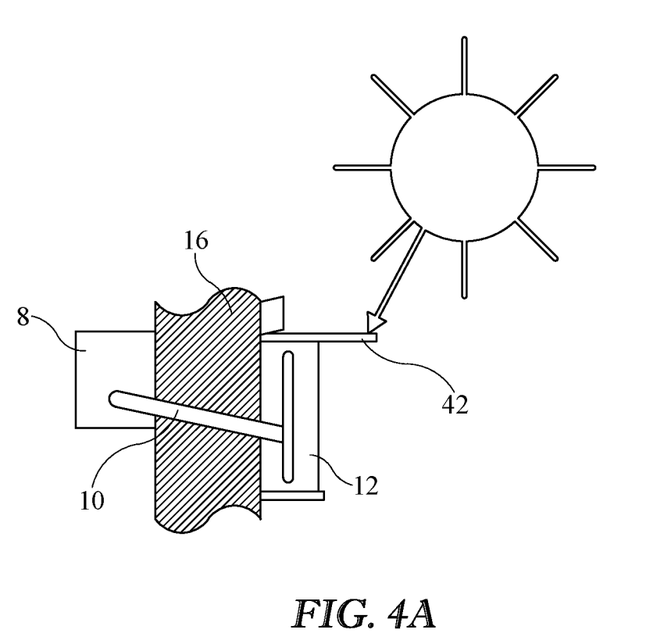
FIGS. 4A-4D offer perspective views of a heat transfer system including heat pipes in relation to an insulated wall, with additional structures to mitigate against or otherwise limit the effects of unwanted thermal games during cooling season, according to multiple embodiments and alternatives.
Figure 4B:
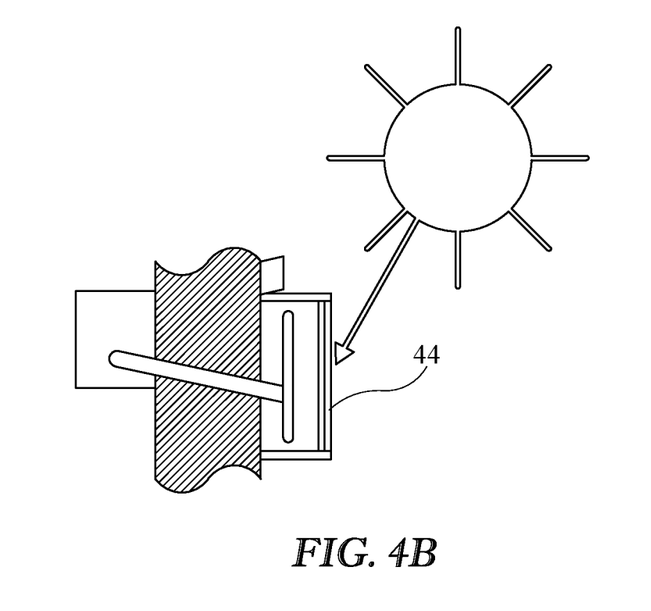

FIG. 4A shows a fixed overhang 42 to eliminate or otherwise reduce exposure to solar insolation. As desired, the overhang is permanently or temporarily attached to structure 5. Depending on the particular latitude, the positioning or length of the overhang can be selected to provide maximum blockage of the sun's rays. Previously, it was discussed that cover 18 can be formed from glass, which is transparent to allow the sun's rays to pass or even to help direct the rays toward the solar absorber. In some embodiments, however, an opaque cover 44, as represented in FIG. 4B, is temporarily placed over the solar absorber at times of the year when this is beneficial. Alternatively, two covers 18, 44 are provided and these can be interchangeable, for example by adding a hinge or a pivot point (not shown) which allows one of them to be moved relative to the other, depending on which cover should be placed between the path of the sun's rays and the solar absorber.

Figure 4C:
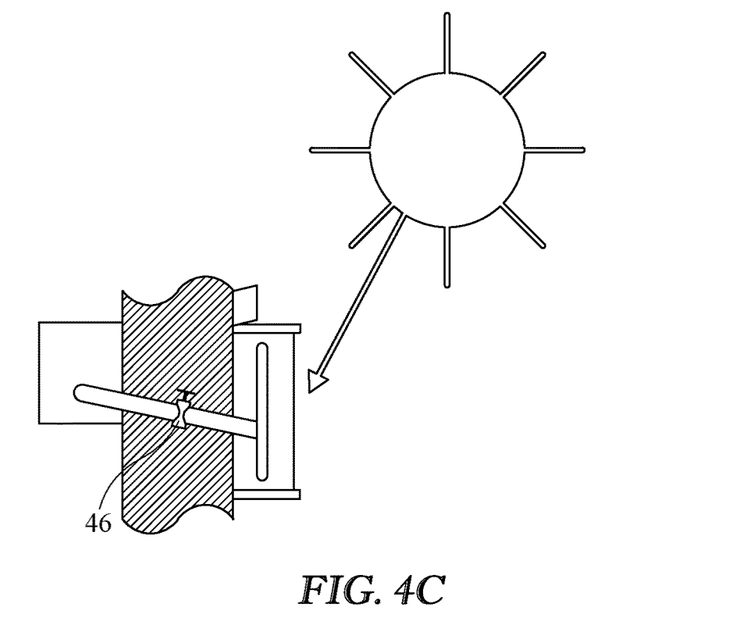
Figure 4D:
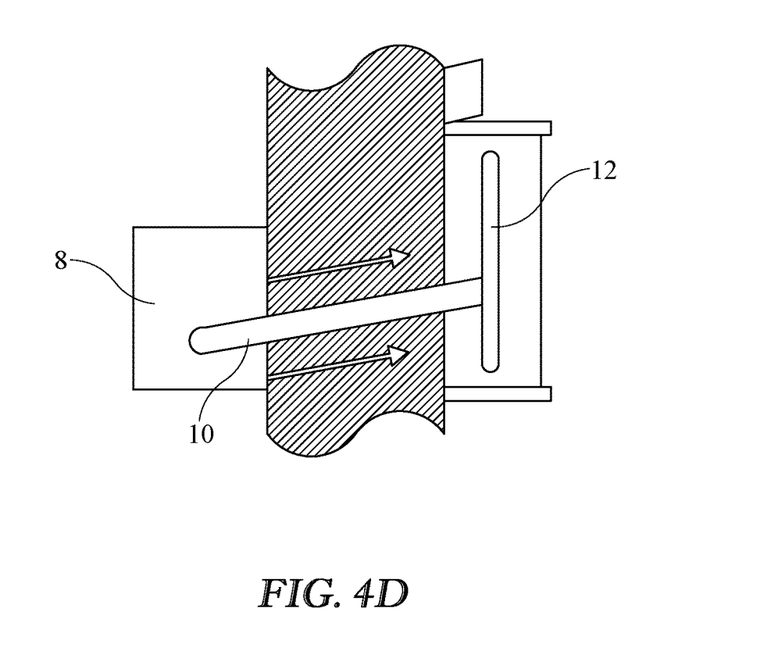

Another option, as shown in FIG. 4C, is a mechanical valve 46 placed within the heat pipe that prevents the two-phase heat transfer from occurring during a time when the gains would be unwanted. Switching the valve between open (on) and closed (off) would interrupt the cycle of the working fluid moving from the condenser to the evaporator. In some embodiments, the valve is installed within the adiabatic section 26 itself; alternatively, the valve is installed between the adiabatic section and the condenser 25. It will be appreciated that several of these approaches, for limiting unwanted gain, can be used together. For example, an opaque cover alone as contemplated by FIG. 4B might still allow small amounts of heat to be occasionally transferred to the system even when insolation was largely eliminated by an opaque cover 44. However, the addition of valve 46 could offset this tendency, as could reversing the incline between the condenser end proximal to interior space 8 and the evaporator end proximal to the solar absorber 12 as in FIG. 4D.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A heat pipe for transferring solar energy, comprising:
a conduit for holding a working fluid, the conduit having:
a first end comprising an evaporator positioned proximal to a solar absorber to receive solar energy, wherein when a working fluid is present in the first end the solar energy that is received from the solar absorber is transferred to the working fluid while the working fluid is in a liquid state and converts the working fluid to a gas state, and wherein the heat pipe is configured for the working fluid to travel in the conduit passively as a gas to a second end comprising a condenser;
wherein the condenser receives the working fluid from the evaporator and is where while the working fluid is in the gas state is converted to the liquid state and wherein the heat pipe is configured for the working fluid to travel in the conduit passively as a liquid to the evaporator;
an adiabatic section between the first end and the second end, the adiabatic section comprising a region of conduit formed from a non-metal thermal insulating material different from the material forming at least one of the conduit ends, the adiabatic section configured to resist heat transfer moving in the direction from the condenser to the evaporator; and
further comprising a valve positioned between the first and second ends to limit heat transfer moving in the direction from the condenser to the evaporator when the valve is closed or partially closed compared to when the valve is opened.

2. The heat pipe of claim 1, wherein the second end is configured to communicate with a storage tank that retains energy produced at the condenser.

3. The heat pipe of claim 1, wherein the adiabatic section is formed from rubber and the condenser and evaporator are formed from a metal or metal alloy.

4. The heat pipe of claim 1, wherein the valve is positioned in the adiabatic section.

5. The heat pipe of claim 1, wherein the evaporator has a fin joined to the solar absorber.

6. A heat transfer system, comprising:
a solar absorber that receives solar energy;
a thermal storage tank;
a plurality of heat pipes, wherein each heat pipe comprises:
a conduit for holding a working fluid,
the conduit having a first end comprising an evaporator that is proximal to the solar absorber where solar energy from the solar absorber is transferred, wherein when the working fluid is present in the first end, the solar energy that is received from the solar absorber is transferred to the working fluid while the working fluid is in a liquid state;
a second end comprising a condenser that receives the working fluid from the evaporator and is where the working fluid is in a gas state, undergoes cooling to convert to a liquid state and wherein the heat pipe is configured for the working fluid to travel passively in the conduit as a liquid to the evaporator; and
an adiabatic section between the first end and the second end, the adiabatic section comprising a region of conduit formed from a non-metal thermal insulating material that is different from the material forming at least one of the conduit ends, the adiabatic section configured to resist heat transfer moving in the direction from the condenser to the evaporator;
wherein the movement of the working fluid in any of said heat pipes produces a temperature gradient between the first and second ends of the conduit and
wherein at least one of the heat pipes further comprises a valve positioned between the first and second ends to limit heat transfer moving in the direction from the condenser to the evaporator when the valve is closed or partially closed compared to when the valve is opened.

7. The system of claim 6, wherein at least one of the heat pipes further comprises a fin joined to the evaporator at the first end proximal to the solar absorber.

8. The system of claim 6, wherein no mechanical pumping force is employed to transport the working fluid as it moves within the heat pipe.

9. The system of claim 6, wherein the adiabatic section is formed from rubber and the condenser and evaporator are formed from a metal or metal alloy.

10. The system of claim 6, further comprising insulation surrounding at least a portion of the conduit.

11. The system of claim 10, wherein the insulation surrounds the entire adiabatic section.

12. The system of claim 6, wherein the second end of at least one of the conduits is at an incline relative to the first end.

13. The system of claim 12, wherein the incline is about 2-10 degrees.

14. The system of claim 6, further comprising at least one lever operatively engaged with at least one of the conduits that adjusts an incline of one end of the conduit relative to the other end.

15. The system of claim 6, wherein the second end of at least one of the heat pipes thermally communicates with the thermal storage tank to allow the thermal storage tank to receive and store energy from the condenser.

16. The system of claim 6, wherein the valve is positioned in the adiabatic section.

17. The system of claim 6, further comprising a cover proximal to the solar absorber.

18. The system of claim 6, wherein at least one heat pipe is entirely positioned outside of, and not in thermal communication with, the thermal storage tank to allow energy from a gas to liquid phase conversion of the working fluid to be transferred directly to an ambient environment surrounding the second end.

19. A method for passive heating of a room of a building, comprising:
    forming a hole in an exterior wall of a building, the wall having a thickness and the hole sufficiently sized to accommodate the heat pipe of claim 1;
    arranging the heat pipe of claim 1 through the wall with the first end positioned on the exterior of the building, the second end on the interior of the building, and at least a portion of the heat pipe between the first and second ends within the thickness of the wall;
    providing a working fluid in a liquid state within the conduit of the heat pipe;
    positioning the first end of the heat pipe in thermal communication with a solar absorber that absorbs solar energy from the sun, wherein the working fluid proximal the first end evaporates and the gas phase of the working fluid transfers to the second end heat pipe where it condenses back to liquid at the condenser, such that the liquid phase of the working fluid transfers to the first end of the heat pipe;
    positioning a valve between the first and second ends of the heat pipe for limiting heat transfer between the respective ends when the valve is closed or partially closed.

20. The method of claim 19, further comprising performing all steps of claim 19 for at least two heat pipes of claim 1, wherein at least one but not all of the heat pipes is positioned in thermal communication with a thermal storage tank positioned in the room.

21. A method for passive cooling of a room of a building by transferring energy to the exterior of the building, comprising:
    configuring a heat pipe with a first end comprising a condenser, a second end comprising an evaporator, and a middle section between the two ends, wherein the heat pipe comprises a conduit for holding a working fluid and positioning a valve between the first and second ends of the heat pipe for limiting heat transfer between the respective ends when the valve is closed or partially closed;
    forming a hole in an exterior wall of a building, the wall having a thickness and the hole sufficiently sized to accommodate the heat pipe;
    arranging the heat pipe through the wall with the condenser positioned exterior of the building, the evaporator in the interior of the building in thermal communication with a thermal storage tank holding a liquid, the energy of which increases as the temperature in the room increases, and at least a portion of the heat pipe between the condenser and evaporator within the thickness of the wall;
    angling the heat pipe with the condenser inclined relative to the evaporator; within the conduit of the heat pipe, providing a working fluid in a liquid state, such that the working fluid evaporates and transfer to the condenser when a temperature gradient exists whereby the liquid temperature in the thermal storage tank exceeds the temperature at the condenser;
    wherein when the working fluid reaches the condenser, the working fluid converts from gas to liquid and energy is released exterior of the building during condensation.

22. The method of claim 21, wherein the middle section is an adiabatic section comprising a region of conduit formed from a non-metal thermal insulating material different from the material forming at least one of the conduit ends.

* * * * *